(12) United States Patent
Atkinson (10) Patent No.: US 9,129,563 B2
(45) Date of Patent: Sep. 8, 2015

(54) SYSTEM AND METHOD FOR TIMING ADJUSTMENT OF A BACKLIGHT MODULE

(75) Inventor: Lee Warren Atkinson, Houston, TX (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 215 days.

(21) Appl. No.: 13/811,694

(22) PCT Filed: Oct. 28, 2010

(86) PCT No.: PCT/US2010/054401
§ 371 (c)(1),
(2), (4) Date: Jan. 23, 2013

(87) PCT Pub. No.: WO2012/057757
PCT Pub. Date: May 3, 2012

(65) Prior Publication Data
US 2013/0127699 A1    May 23, 2013

(51) Int. Cl.
*G09G 3/34* (2006.01)
*G02F 1/1335* (2006.01)

(52) U.S. Cl.
CPC ............ *G09G 3/3406* (2013.01); *G02F 1/1336* (2013.01); *G02F 2001/133612* (2013.01); *G09G 2320/041* (2013.01)

(58) Field of Classification Search
CPC . G09G 3/3406; G09G 3/18; G09G 2320/041; G09G 2320/052; G09G 2310/0237
USPC .................................. 345/101–102
See application file for complete search history.

(56) References Cited

U.S. PATENT DOCUMENTS

| | | | |
|---|---|---|---|
| 4,745,403 A * | 5/1988 | Tamura ......................... | 345/101 |
| 5,929,833 A * | 7/1999 | Koshobu et al. ............... | 345/101 |
| 6,069,448 A | 5/2000 | Yeh | |
| 6,256,006 B1 * | 7/2001 | Yamamoto et al. ........... | 345/101 |
| 2002/0149576 A1 * | 10/2002 | Tanaka et al. .................. | 345/204 |
| 2003/0107546 A1 * | 6/2003 | Ham .............................. | 345/101 |
| 2005/0179854 A1 * | 8/2005 | Sekine et al. .................. | 349/161 |
| 2006/0092186 A1 * | 5/2006 | Yoshihara et al. ............. | 345/690 |

(Continued)

FOREIGN PATENT DOCUMENTS

JP         2008102215 A    5/2008
KR    10-2006-0129896 A    12/2006

(Continued)

OTHER PUBLICATIONS

PCT; "Notification of Transmittal of the International Search Report and the Written Opinion of the International Searching Authority, or the Declaration" for PCT/US2010/054401 mailed Jul. 28, 2011; 9 pages.

(Continued)

*Primary Examiner* — Dorothy Harris
(74) *Attorney, Agent, or Firm* — Hewlett-Packard Patent Department (57) ABSTRACT

Examples of the present invention disclose system and method timing adjustment of a backlight module for a display. According to one example, a temperature of the display is monitored and a response time associated with the display is determined based on the temperature. Furthermore, a power-on timing and/or a power-off timing of the backlight module is adjusted based on the determined response time and the monitored temperature.

11 Claims, 6 Drawing Sheets

(56) References Cited

U.S. PATENT DOCUMENTS

| | | |
|---|---|---|
| 2007/0132709 A1* | 6/2007 | Kawaguchi .................. 345/102 |
| 2007/0188711 A1 | 8/2007 | Sharp et al. |
| 2008/0001911 A1* | 1/2008 | Kim .............................. 345/102 |
| 2008/0084519 A1 | 4/2008 | Brigham et al. |
| 2008/0204481 A1* | 8/2008 | Mostinski .................... 345/690 |
| 2009/0128735 A1 | 5/2009 | Larson et al. |
| 2009/0195171 A1 | 8/2009 | Huang et al. |
| 2011/0096105 A1* | 4/2011 | Park et al. .................... 345/690 |
| 2011/0267383 A1* | 11/2011 | Murakami et al. ........... 345/690 |
| 2012/0007969 A1* | 1/2012 | Lin ................................ 348/56 |
| 2012/0113166 A1* | 5/2012 | Murakami et al. ........... 345/690 |

FOREIGN PATENT DOCUMENTS

| | | |
|---|---|---|
| KR | 10-2008-0001875 A | 1/2008 |
| KR | 10-2009-0108565 A | 10/2009 |
| WO | WO-2005106572 A1 | 11/2005 |

OTHER PUBLICATIONS

NEC Display Solutions—Monitor: Features and Functions for Professional Models, NEC Display Solutions, Ltd., online <http://www.nec-display.com/ap/en_display/h_grade/func.html>, accessed Jul. 14, 2010, and copyrighted no earlier than 2007, 4 pp.

* cited by examiner

SYSTEM AND METHOD FOR TIMING ADJUSTMENT OF A BACKLIGHT MODULE

BACKGROUND

In recent years, three-dimensional entertainment has grown in popularity to the extent that displays configured with three-dimensional functionality are now desired for home and personal use. One such display, a three-dimensional stereoscopic display, interleaves left and right image frames at high speeds (e.g. 120 hertz or greater). The period between image frames (typically eight milliseconds) relies on fast transfer timing from the operating host and a period of hold time for the image. In particular, the hold time is the period where the image is viewable per eye and may typically last for only two to three milliseconds per image frame.

The response time of a liquid crystal display (LCD) is a significant period of the image-draw interval, or the period from when the electrical signal is delivered to the thin film transistors (TFT) of the display to the time the liquid crystal material of the LCD display is polarized correctly. Even in the case that electrical overdrive technique is applied, in which sufficiently high voltage is applied to the LCD material; the response time may still be longer than several milliseconds. Furthermore, a slow response time may lead to an optical illusion effect known as ghosting, or vision crossover of one eye into the other eye, possibly creating a seemingly double image on the display as viewed by the user.

BRIEF DESCRIPTION OF THE DRAWINGS

The features and advantages of the inventions as well as additional features and advantages thereof will be more clearly understood hereinafter as a result of a detailed description of particular embodiments of the invention when taken in conjunction with the following drawings in which:

FIG. 1A is a three-dimensional perspective view of a three-dimensional display and operating environment thereof, while

DETAILED DESCRIPTION OF THE INVENTION

The following discussion is directed to various embodiments. Although one or more of these embodiments may be discussed in detail, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Prior ghosting prevention solutions include synchronizing the timing of a frame-sequential three-dimensional display. Here, either three-dimensional shutter glasses or the backlight module timing of the display is synchronized with a valid image of the display. More specifically, a calibration phase is performed in which each manufactured display panel is allowed to operate for a long time and then the response time is specifically calibrated for each display panel. However, such a technique is not conducive for large scale manufacturing and also does not take into account the inevitable environmental changes that mobile products (e.g. notebook computer) undergo when used by the end customer. In addition, a common method for obscuring the image view is by blanking the LCD backlight during the view period, then enabling the backlight once the LCD material is properly positioned. This "presentation time" is the moment that the eye is exposed to the correctly drawn panel. That is, the full image frame on the display is not immediately viewable as the image pixels are only proportionally open until the drawing time is finished.

More generally, the liquid crystal material of a LCD display is a mechanical element and moves in response to an electric field, thereby functioning as a mechanical valve to allow a proportional amount of light to flow from the background module to the front surface of the display. The time for the liquid crystal to open to the desired aperture is called the response time. As such, the response time represents the delay between when the pixel is written to and when it is in a proper viewing state for the operating user. And since 1) the response time of a liquid crystal display (LCD) relies on the viscosity of the liquid crystal material, and 2) this viscosity is affected by temperature, a method for compensating the valid image frame through prediction of the response time is needed.

Examples of the present invention provide a system and method for timing adjustment of a backlight module in a frame-sequential three-dimensional display. Accordingly to one example, the temperature associated with the display is measured and response time of display is predicted. In response, modulation timing of the backlight module is adjusted to coincide with the predicted response time. As such, a bright and ghost-free three-dimensional display may be provided in which timing of the backlight module is automatically adjusted based on the environment in which it is used.

Figure 1A:
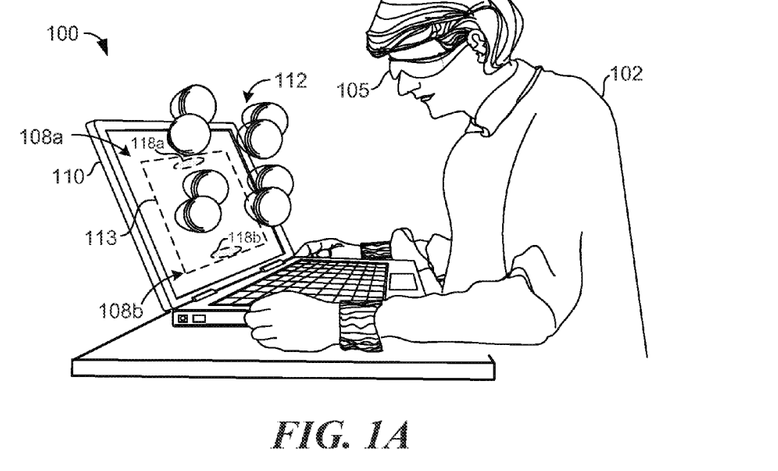
Figure 1B:
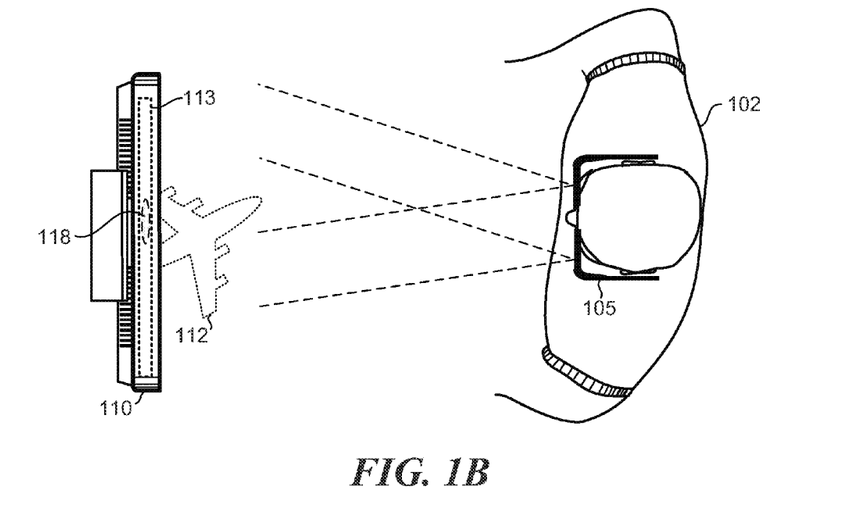
FIG. 1B is a top-down view of a three-dimensional display and operating environment thereof according to an example of the present invention.

Referring now in more detail to the drawings in which like numerals identify corresponding parts throughout the views, FIG. 1A is a three-dimensional perspective view of a three-dimensional display and operating environment thereof, while FIG. 1B is a top-down view of a three-dimensional display and operating environment thereof according to an example of the present invention. As shown in FIG. 1A, the three-dimensional computing environment 100 includes a user 102 operating a computing device 110 such as a notebook computer. The computing device 110 is includes a liquid crystal display (LCD) 113 adapted to provide a three-dimensional image 112 to the user 102. Furthermore, the display 113 includes two sensors 118a and 118b positioned in an upper area 108a and a lower area respectively, of the display 110. In one example, sensors 118a and 118b are configured to monitor a temperature of the display material (e.g. liquid crystals). For example, a higher temperature will indicate a faster response time for the display so as to cause a backlight module to turn on and off earlier. According to the present embodiment, the relative temperature may be monitored at the upper area 108a of the display 110 via sensor 118a for adjusting the power-off time of the backlight module, and the relative temperature may be monitored at a lower area 118b of the display 110 via sensor 118b for adjusting the power-on time of the backlight module.

Turning now to the example shown in FIG. 1B, the three-dimensional computing environment includes a user 102 operating a computing device such as an all-in-one computer 110. Here, computer 110 includes a display 113 configured to present a three-dimensional image 112 to the user 102. In addition, a temperature sensor 118 is coupled to the display 113 for monitoring thermal conditions of the display material 113 while in use. As shown in this example, a single sensor 118 is positioned in a central area of the display 113 in order to provide uniform and accurate temperature monitoring of the three-dimensional display.

Figure 2:
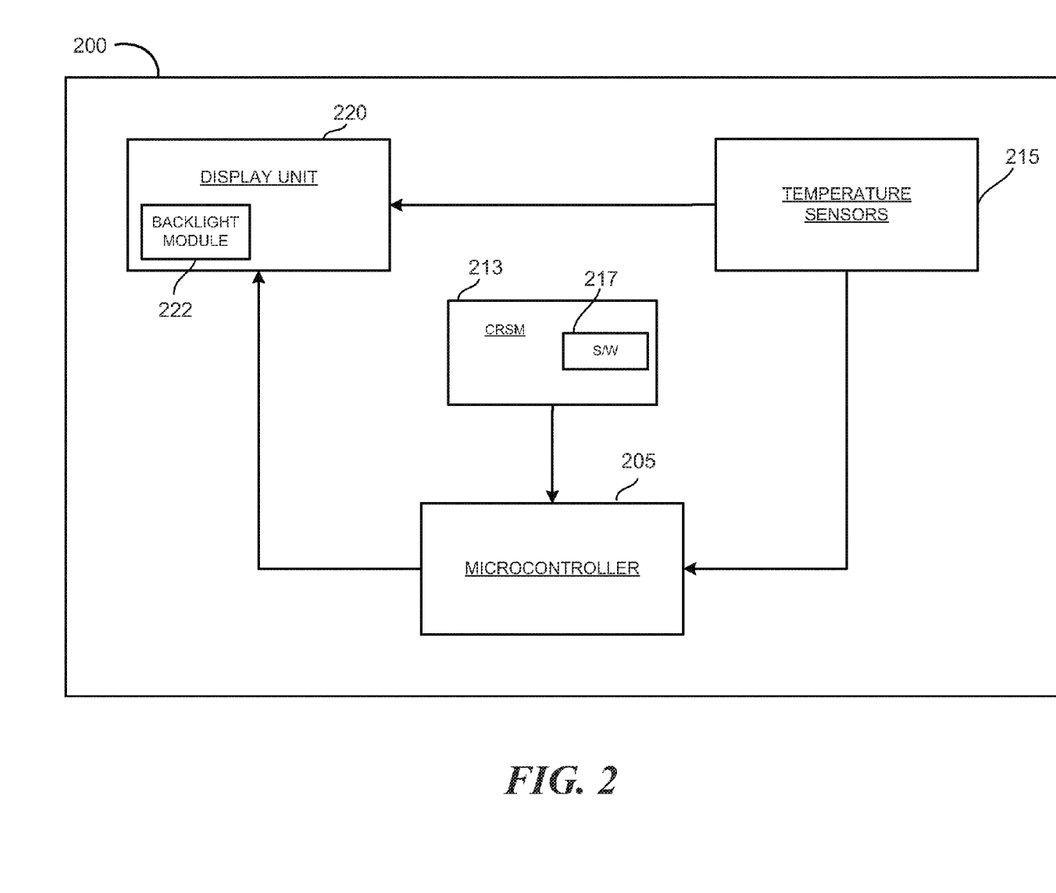
FIG. 2 is simplified block diagram of a timing adjustment system according to an example of the present invention.

FIG. 2 is simplified block diagram of a timing adjustment system according to an example of the present invention. In the present example, the timing adjustment system 200 includes a microcontroller 205 coupled to a display unit 220, sensors 215, and a computer-readable storage medium 213. According to one example, the microcontroller 205 represents a central processing unit configured to execute program instructions. Display unit 220 represents an electronic visual display such as a frame-sequential three-dimensional display configured to display three-dimensional images to a user, and also includes a backlight module 222. Backlight module 222 includes a light source (e.g. fluorescent lamps) such as an LED array, a hot cathode fluorescent lamp (HCFLs), a cold cathode fluorescent lamp (CCFL), or the like. Furthermore, the backlight module 222 is powered on and off continuously via internal control circuitry or in accordance with a control signal from the microcontroller 205 so as to regulate the amount of light produced by the backlight module 222. Temperature sensors 215 represent a device configured to measure a temperature and convert the measurement to a signal to be read by the microcontroller 205 such as a thermistor, thermocouple sensor, or the like. Storage medium 213 represents volatile storage (e.g. random access memory), non-volatile store (e.g. hard disk drive, read-only memory, compact disc read only memory, flash storage, etc.), or combinations thereof. Furthermore, storage medium 213 includes software 217 that is executable by the microcontroller 205 and, that when executed, causes the processing unit 205 to perform some or all of the functionality described herein.

Figure 3:
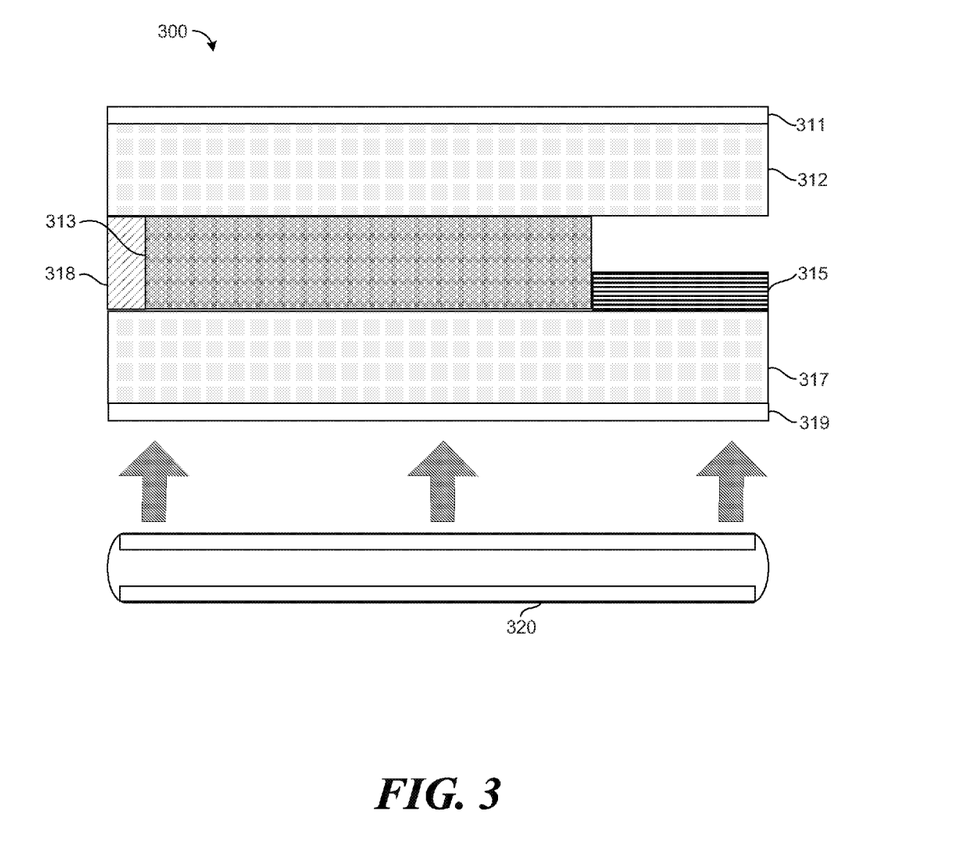
FIG. 3 is a cross-sectional view of a LCD display according to an example of the present invention.

FIG. 3 is a cross-sectional view of a LCD display according to an example of the present invention. As shown here, the display 300 includes a number of stackable films or layers including a backlight module 320, an upper and lower substrate 312 and 317, a thin film transistor 315, sensor 318, and liquid crystals 313. Backlight module 320 includes a light source having effective power timing (i.e. on and off) for controlling the amount of light produced by the module. According to the present example, light (indicated by upward arrows) is output from the backlight module 320 and received at a lower polarizing filter 319. In one example, the lower polarizing filter serves as a device capable of converting the received light from the backlight module 320 into a more defined polarized light source for the layers above. Lower substrate 317 is positioned above the backlight module 320 and may represent a thin film transistor substrate including a thin film transistor array adapted to control the pixel array for displaying grayscales and colors.

According to an example of the present invention, temperature sensor 318, liquid crystals 313, and a thin-film-transistor 315 are formed above the lower substrate 317. Upon receiving voltage, the liquid crystals 313 change on a molecular level so to adjust the transmittance of the incident light output from the backlight module 320. As mentioned above, the temperature sensor 318 may represent a thermistor device configured to monitor the temperature of the liquid crystals 313. Still further, upper substrate 312 is formed above both the thin film transistor 315 and liquid crystals 313, and may represent a color filter substrate having a color filter array configured to produce a plurality of colors. In the present example, an upper polarizing filter 311 is formed over the upper substrate 312 and is configured to further polarize the light source output from the backlight module 320.

Figure 4:
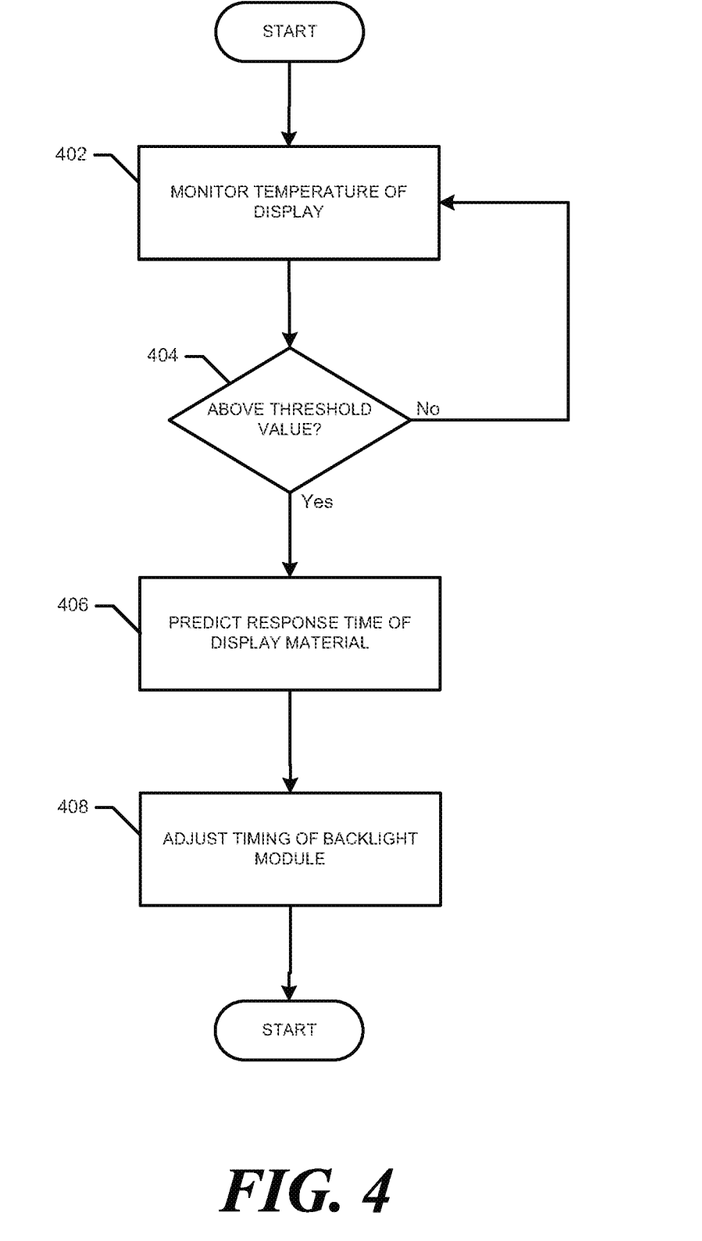
FIG. 4 is a flow chart illustrating the processing steps for adjusting the power timing of the backlight module using a single sensor according to an example of the present invention.

FIG. 4 is a flow chart illustrating the processing steps for adjusting the backlight timing using a single sensor according to an example of the present invention. In step 402, a temperature associated with the display is monitored by at least one temperature sensor coupled to the microcontroller. If the temperature is above a predetermined threshold value in step 404, then the microcontroller calculates or predicts a response time of liquid crystals in step 406. For example, if the temperature is above a normal operating temperature (i.e. high temperature) then the liquid crystals are able to form the image faster, thus a faster or accelerated response time is assigned to the liquid crystals. For example, the operating temperature of the display material may range anywhere between −20° C. and 70° C. If the predetermined threshold value is set to 30° C., then the response time of the display material will be predicted or determined to in a temporary accelerated state (e.g. less than 2 milliseconds) when the temperature of the display material is above 30° C. Next, in step 408, the microcontroller adjusts the current power timing of the backlight module to correspond to the accelerated response time of the liquid crystals associated with the display. For example, if the backlight module has a current power cycle appropriate for an LCD response time of 2 milliseconds, then the microcontroller will adjust the power timing cycle such that the power-on time and the power-off time occurs in less than 2 milliseconds as will be explained in more detail with reference to FIGS. 6A-6D.

Figure 5:
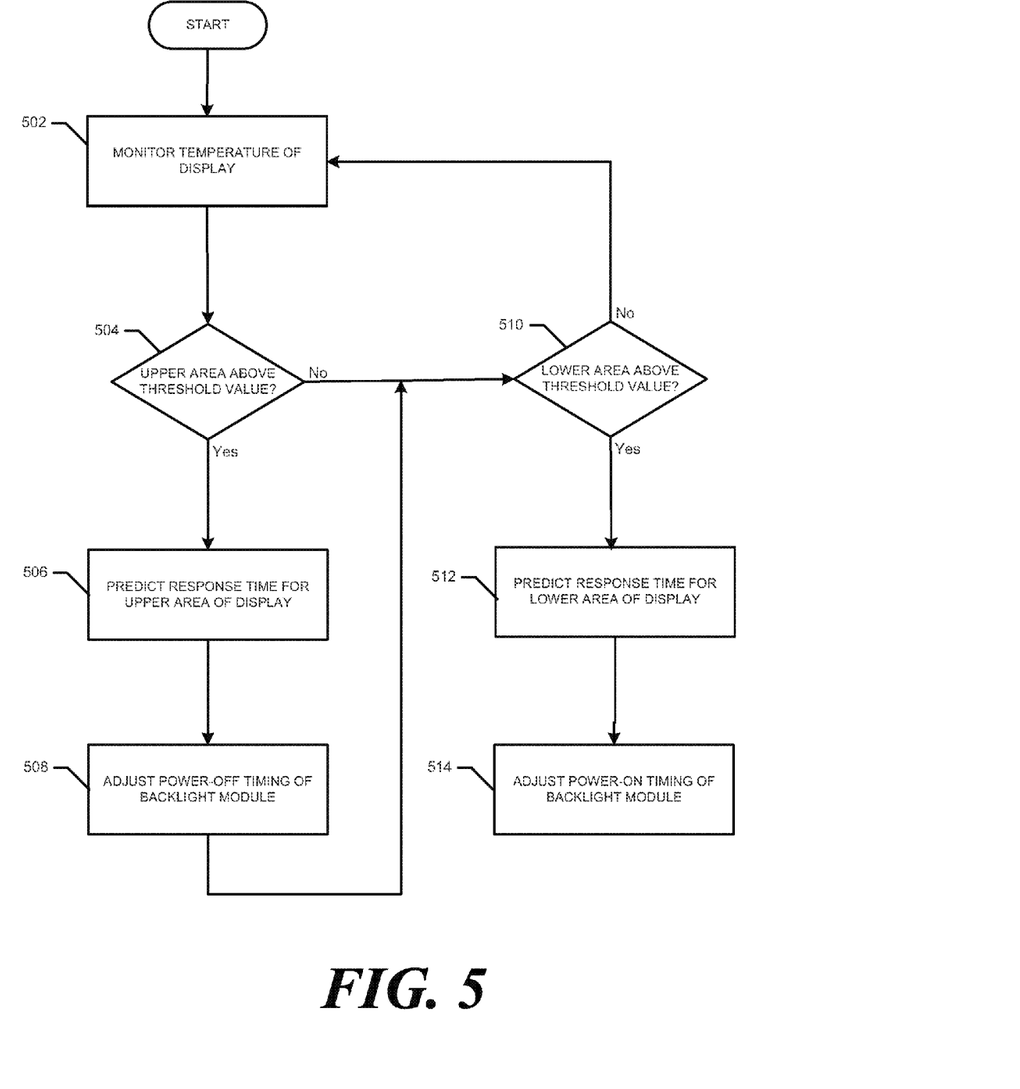
FIG. 5 is a flow chart illustrating the processing steps for adjusting the power timing of the backlight module using multiple sensors according to an example of the present invention.

FIG. 5 is a flow chart illustrating the processing steps for adjusting the backlight timing using multiple sensors according to an example of the present invention. In step 502, a plurality of temperature sensors are coupled to the microcontroller for monitoring temperatures associated with different areas of the display. If, in step 504, the temperature of a first sensor positioned in an upper area of the liquid crystals is determined to be above a predetermined threshold value (i.e. higher than normal operating temperature), then an accelerated response time of the liquid crystals is determined or predicted for the upper area of the display material (e.g. liquid crystals) in step 506. Thereafter, in step 508 only the power-on timing of the backlight module is reduced so that the backlight module turns off earlier than the current power timing. Similarly, if a lower area of the display material is determined to be above the threshold value in step 510, then an accelerated response time is determined or predicted for the lower area of the liquid crystals in step 512. Next, in step 514 only the power-on timing of the backlight module is reduced so that backlight module turns on earlier than the current power timing.

Figure 6A:
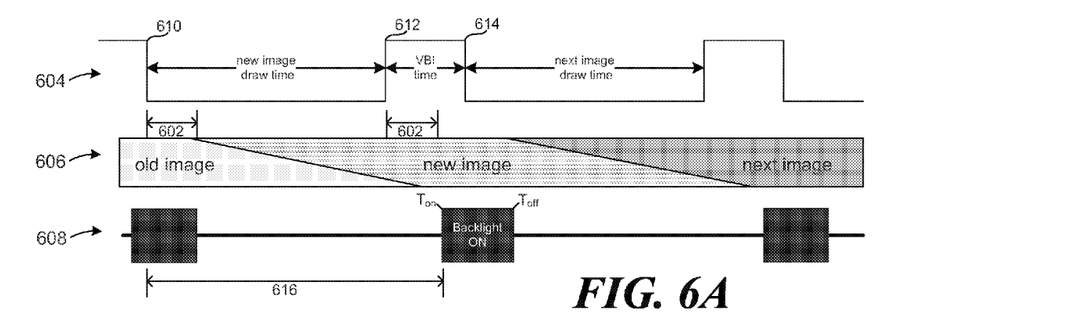
FIGS. 6A-6C are simplified timing diagrams for the backlight module according to an example of the present invention.
Figure 6B:
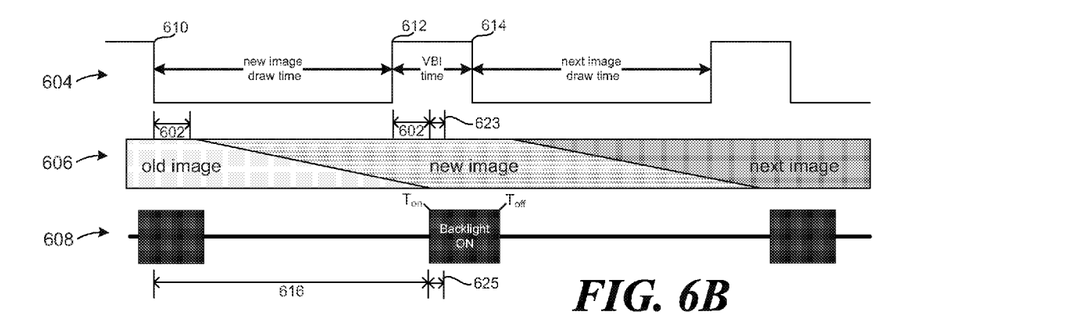
Figure 6C:
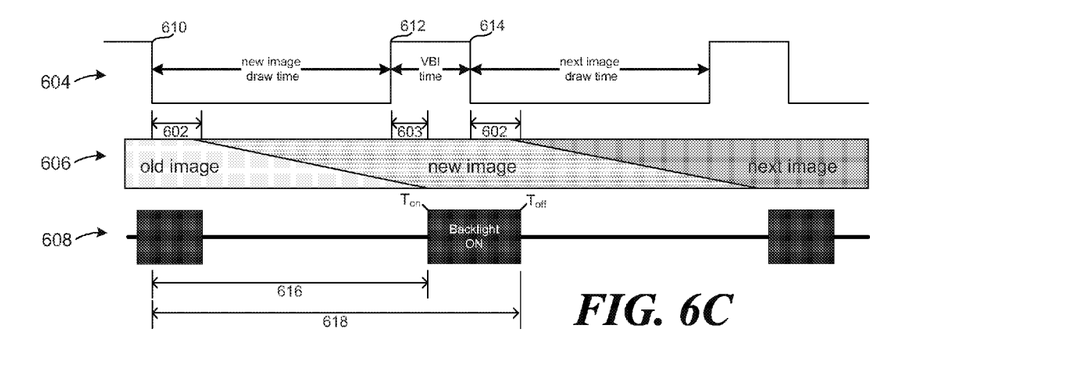

FIGS. 6A-6C are simplified timing diagrams for the backlight module according to an example of the present invention. As shown in FIG. 6A, a normal operating timing has the backlight module being turned off and on in synchronization with an image of the LCD. In one example, timing diagram 604 represents an electrical representation of the draw sequence of a new image on LCD display. The first pixel of the first line of the TFT array 315 is drawn at 610 and continues until point 612, at which point the electrical configuration of the last pixel of the last line is finished. Point 612 also represents the start of the "vertical blanking time" (VBI), which is the start of a brief duration where writing to the TFT array 315 ceases for a short time, typically about 2.7 milliseconds. According to one example, images 606 represent the formation of the image pixels (i.e., old image, new image, next image) after the electrical timing configuration 604. The LCD material itself forms after the LCD response delay time 602 and in accordance with the TFT matrix 315 configuration. The microcontroller 205 enables the backlight module (i.e. turned on) after a delay 616 from the start timing of the new image draw 610. Furthermore, the backlight module is turned on (Backlight ON) for a fixed duration, namely a duration proportional to the VBI time (e.g., 2.7 milliseconds).

FIG. 6B depicts a timing diagram of the backlight module after being adjusted by the microcontroller. Here, a single sensor is utilized for monitoring the temperature of the display material. For example, FIG. 6A may represent a monitored LCD temperature of 30° C. and a corresponding LCD response time of 2 milliseconds. With respect to FIG. 6B, the temperature of the LCD material is increased from 30° C. to 50° C. As a result, the response time 602 of the liquid crystals is decreased or accelerated by a time amount 623 (e.g. 1 millisecond). In this example, the delay 616 is also reduced by a corresponding timing 625 (e.g. 1 millisecond) at the higher temperature. When utilizing a single sensor, and upon prediction of the accelerated response time 602, the delay for both power-on timing ($T_{on}$) and the power-off timing ($T_{off}$) are reduced by decreasing the delay 616 in FIG. 6B in comparison to the lower monitored temperature and associated delay 616 shown in FIG. 6A.

FIG. 6C depicts an adjusted timing diagram for the backlight module when multiple sensors are utilized for monitoring the temperature of the display material. According to one example, when a lower area temperature of the display is determined to be above a threshold value, a faster response time 603 is predicted for that area and only the power-on timing ($T_{on}$) is adjusted as shown in FIG. 6C thru time delay 616. On the other hand, when an upper area temperature of the display is determined to be above a threshold value, a faster response time is predicted for that area and only the power-off timing ($T_{off}$) is adjusted as shown in FIG. 6C thru delay 618. That is, the power-on duration for the backlight module (backlight ON) is varied as the difference in temperature between the top and bottom of the LCD changes.

Accordingly, examples of the present invention provide a system and method for adjusting the power timing of a backlight module associated with a display. More particularly, a temperature of the display material is monitored and a response time for the display material is determined. Based on this determination, the power-on and/or power-off timing of the backlight module is adjusted from the current timing to correspond with the response time of the display material. As such, the display in accordance with examples of the present invention enables automatic timing adjustment of the backlight module thus providing a ghost-free image for the user regardless of the operating environment and temperature thereof.

Furthermore, while the invention has been described with respect to exemplary embodiments, one skilled in the art will recognize that numerous modifications are possible. For example, although exemplary embodiments depict a notebook computer and all-in-one computer as the implemented computing device, the invention is not limited thereto. For example, the computing device may be a netbook, a tablet personal computer, a smartphone, or any other computing device including display material that may have varying operating temperatures. Moreover, the timing adjustment system and method may be effectively applied in a two-dimensional operating environment in addition to the three-dimensional operating environment depicted in the FIGS. 1A and 1B.

Furthermore, examples of the present invention may be accomplished without sensors coupled to and monitoring the temperature of the liquid crystals. For example, the temperature of the display may be estimated rather than measured, by calculating the amount of time the display has been in continuous operation (i.e. powered on), or by measuring other factors that contribute to heating of the display. More particularly and according to one example, a backlight intensity and refresh rate of the display may be measured to predict the influence of power consumption on temperature. Thus, although the invention has been described with respect to exemplary embodiments, it will be appreciated that the invention is intended to cover all modifications and equivalents within the scope of the following claims.

What is claimed is:

1. A system comprising:
an electronic visual display including a response time and a backlight module for presenting an image to a user;
a first thermal sensor to measure a temperature of an upper area of the display; and
a second thermal sensor to measure a temperature of a lower area of the display,
wherein a power-on duration time of the backlight module is adjusted by adjusting a power-on timing and/or a power-off timing of the backlight module based on a determined response time and a monitored temperature associated with the display,
wherein when the measured temperature from the first thermal sensor is higher than a first predetermined value and when the measured temperature from the second thermal sensor is not higher than a second predetermined value, then just the power-off timing of the backlight module is adjusted to be faster than the current timing,
and wherein when the measured temperature from the second thermal sensor is higher than the second predetermined value and when the measured temperature from the first thermal sensor is not higher than the first predetermined value, then just the power-on timing of the backlight module is adjusted to be faster than the current timing.

2. The system of claim 1, further comprising:
a microcontroller configured to adjust the power-on timing and/or power-off timing of the backlight module to be faster than the current timing when the response time is determined to be accelerated.

3. The system of claim 1,
wherein when the measured temperature from the first thermal sensor is higher than the first predetermined value and when the measured temperature from the second thermal sensor is higher than the second predetermined value, then both the power-on timing and the power-off timing of the backlight module is adjusted to be faster; and
wherein when the measured temperature from the first thermal sensor is not higher than the first predetermined value and when the measured temperature from the second thermal sensor is not higher than the second predetermined value, then neither the power-on timing nor the power-off timing of the backlight module is adjusted to be faster.

4. The system of claim 1, wherein the display is configured to provide a three-dimensional image to a user.

5. The system of claim 1, wherein the display is a liquid crystal display and the first thermal sensor and the second thermal sensor is a thermistor configured to monitor the temperature of liquid crystals associated with the liquid crystal display.

6. A method comprising:
monitoring, via a first thermal sensor coupled to a display, a temperature of an upper area of the display, the display including a response time and a backlight module;
monitoring, via a second thermal sensor coupled to the display, a temperature of a lower area of the display; and
predicting the response time of the display based on the monitored temperature,
wherein a power-on duration time of the backlight module is adjusted by adjusting a power-on timing and/or power-off timing associated with the backlight module based on the predicted response time of the display,
wherein when the measured temperature from the first thermal sensor is higher than a first predetermined value and when the measured temperature from the second thermal sensor is not higher than a second predetermined value, then just the power-off timing of the backlight module is adjusted to be faster than the current timing,
and wherein when the measured temperature from the second thermal sensor is higher than the second predetermined value and when the measured temperature from the first thermal sensor is not higher than the first predetermined value, then just the power-on timing of the backlight module is adjusted to be faster than the current timing.

7. The method of claim 6, further comprising:
adjusting the power-on timing and the power-off timing of the backlight module to be faster than the current timing when the response time is predicted to be in an accelerated state.

8. The method of claim 6, wherein when the measured temperature from the first thermal sensor is higher than the first predetermined value and when the measured temperature from the second thermal sensor is higher than the second predetermined value, then both the power-on timing and the power-off timing of the backlight module is adjusted to be faster; and
wherein when the measured temperature from the first thermal sensor is not higher than the first predetermined value and when the measured temperature from the second thermal sensor is not higher than the second predetermined value, then neither the power-on timing nor the power-off timing of the backlight module is adjusted to be faster.

9. A non-transitory computer readable storage medium having stored executable instructions, that when executed by a processor, causes the processor to:
monitor, via a first thermal sensor coupled to a display, a temperature of an upper area of the display, the display including a response time and a backlight module;
monitor, via a second thermal sensor coupled to the display, a temperature of a lower area of the display; and
predict the response time of the display based on the monitored temperature,
wherein a power-on duration time of the backlight module is adjusted by modulating a power-on timing and/or power-off timing associated with the backlight module based on the predicted response time of the display,
wherein when the measured temperature from the first thermal sensor is higher than a first predetermined value and when the measured temperature from the second thermal sensor is not higher than a second predetermined value, then just the power-off timing of the backlight module is adjusted to be faster than the current timing,
and wherein when the measured temperature from the second thermal sensor is higher than the second predetermined value and when the measured temperature from the first thermal sensor is not higher than the first predetermined value, then just the power-on timing of the backlight module is adjusted to be faster than the current timing.

10. The non-transitory computer readable storage medium of claim 9, wherein the executable instructions further cause the processor to:
adjust the power-on timing and the power-off timing of the backlight module to be faster than the current timing when the response time is determined to be accelerated.

11. The non-transitory computer readable storage medium of claim 9, wherein when the measured temperature from the first thermal sensor is higher than the first predetermined value and when the measured temperature from the second thermal sensor is higher than the second predetermined value, then both the power-on timing and the power-off timing of the backlight module is adjusted to be faster; and
wherein when the measured temperature from the first thermal sensor is not higher than the first predetermined value and when the measured temperature from the second thermal sensor is not higher than the second predetermined value, then neither the power-on timing nor the power-off timing of the backlight module is adjusted to be faster.

* * * * *